No. 669,768. Patented Mar. 12, 1901.
H. J. SITTERLY.
BASKET.
(Application filed Dec. 24, 1900.)
(No Model.)
Fig. 1.
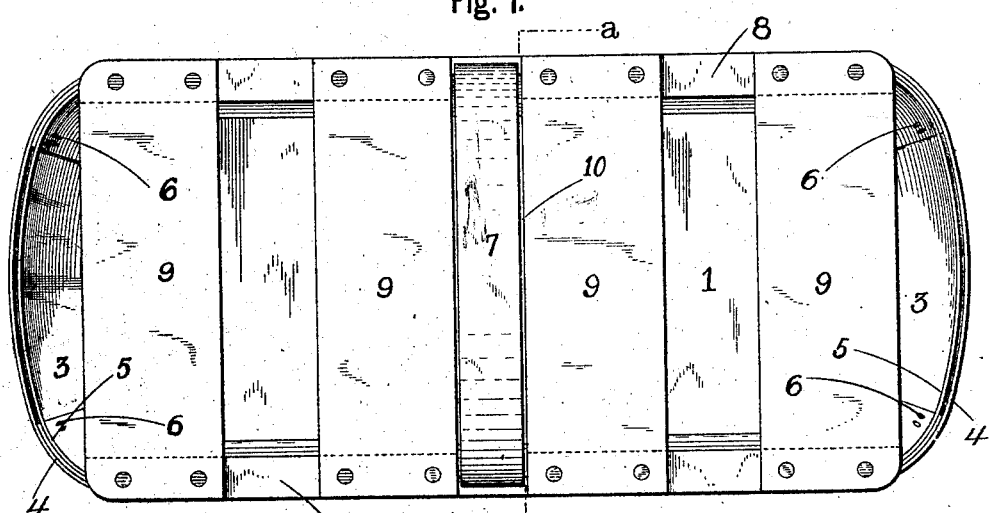
Fig. 2. Fig. 3.
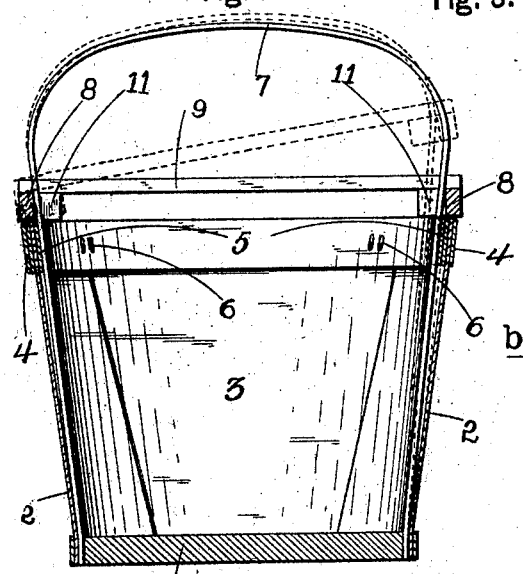
Fig. 4.
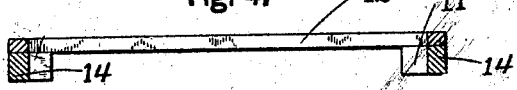
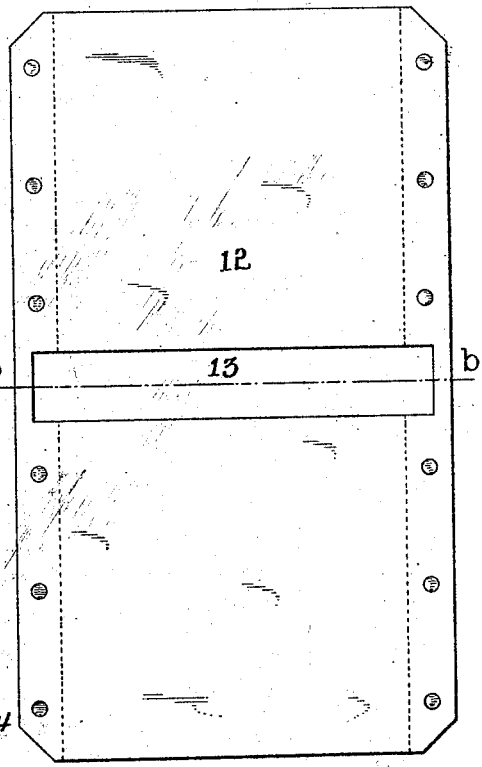
Witnesses.
L. M. Billings.
Geo. A. Neubauer.
Inventor.
Henry J. Sitterly
By A. J. Sangster, Attorney.

UNITED STATES PATENT OFFICE.

HENRY J. SITTERLY, OF BROCTON, NEW YORK, ASSIGNOR TO THE PORTVILLE BASKET CO., OF PORTVILLE, NEW YORK.

BASKET.

SPECIFICATION forming part of Letters Patent No. 669,768, dated March 12, 1901.

Application filed December 24, 1900. Serial No. 40,847. (No model.)

*To all whom it may concern:*

Be it known that I, HENRY J. SITTERLY, a citizen of the United States, residing at Brocton, in the county of Chautauqua and State of New York, have invented certain new and useful Improvements in Baskets, of which the following is a specification.

My invention relates to an improved basket designed especially for transporting grapes or other fruits or vegetables and having a handle and a cover provided with an opening for the passage of the handle, said cover being held in place by the spring of the handle; and the primary object of the invention is to lock the cover in place on the basket by the spring tension of the handle, and thus dispense with any extra fastening.

For a full understanding of the merits and advantages of the invention reference is to be had to the accompanying drawings and the following description.

The invention is susceptible to various changes in the form, proportion, and minor details of construction without departing from the principle or sacrificing any of the advantages thereof, and to a full disclosure of the invention an adaptation thereof is shown in the accompanying drawings, in which—

Figure 1 is a top plan view of my improved basket. Fig. 2 is a vertical transverse section on or about line $a\,a$, Fig. 1, the cover being shown in its locked position in full lines and partially raised from the basket in dotted lines. Fig. 3 is a detached top plan view of a modified cover. Fig. 4 is a vertical transverse section on or about line $b\,b$, Fig. 3.

In referring to the drawings in detail like numerals designate like parts.

My improvement is chiefly adapted for transporting grapes, and the basket employed is preferably oblong in shape, having a bottom 1, formed of a piece of wood of suitable shape and thickness, sides 2, and ends 3, of thin veneering or similar material, which are secured at their lower edges to the edge of the bottom and slope or extend outwardly from each other, and top projecting and strengthening strips 4 and 5, which extend around the outer and inner surface of the top edge of the sides and ends. These are all secured together by staples or other fastenings 6.

The handle 7 is of a substantially U-shaped form, substantially as shown in Fig. 2, and is secured at its ends to the inner surface of the basket sides by staples or other fastenings. As the handle ends extend parallel with the sloping sides of the basket, and thus gradually diverge from each other in an upward direction, the greatest width of the arch or bow formed thereby is located above the top edge of the basket.

The preferred form of cover illustrated in Fig. 1 is formed of several portions of wood having side bars 8, which are comparatively thick, and cross-strips 9, of thin veneering, are arranged and fastened upon the side bars. The two cross-strips nearest the middle of the cover are separated sufficiently to leave a transverse space or opening 10 for the passage of the handle, said transverse space being shorter in length than the width of the handle-arch at the top edge of the basket.

In placing the cover upon the basket one side of the cover is placed upon the top edge of the basket, with the handle fitting through the opening or space 10, and the opposite side of the cover is forced downward, the handle-arch and the basket sides springing inward as it moves downward and substantially resuming their former position when the cover is in place, so that the cover is held in place upon the basket with a spring tension. This does away with any separate fastening, and the cover can be easily and quickly placed upon and removed from the basket.

The side bars 8 may be provided with notches 11 to lengthen the opening or space 10 should it be too narrow to permit the easy placing upon or removal of the cover from the basket. (See Figs. 1 and 2.)

In the modified form of cover shown in Figs. 3 and 4 a single strip of thin material 12, having a substantially central elongated transverse opening 13, is employed. This strip may be strengthened by side bars 14, if desired.

I claim as my invention—

1. An improved basket having a handle of arch shape with the widest portion of the arch located above the top of the basket, and a cover having an opening to pass over the handle, said opening being shorter than the width of the handle-arch at the top of the basket.

2. In a basket, an arched handle with its side parts diverging above the top of the basket, and a cover having an opening to pass over the handle, said opening being shorter than the distance between the side parts of the handle at the top of the basket.

3. In a basket, an arched handle with its side parts diverging above the top of the basket and its ends extending within the basket and secured between the sides and bottom thereof, and a cover having an opening to pass over the handle, said opening being shorter than the distance between the side parts of the handle at the top of the basket.

HENRY J. SITTERLY.

Witnesses:
 FRANZ C. LEWIS,
 J. A. H. SKINNER.